US012050673B2

(12) United States Patent
Ton-That

(10) Patent No.: US 12,050,673 B2
(45) Date of Patent: *Jul. 30, 2024

(54) METHODS FOR PROVIDING INFORMATION ABOUT A PERSON BASED ON FACIAL RECOGNITION

(71) Applicant: Clearview AI, Inc., New York, NY (US)

(72) Inventor: Cam-Hoan Ton-That, New York, NY (US)

(73) Assignee: Clearview AI, Inc., New York, NY (US)

(*) Notice: Subject to any disclaimer, the term of this patent is extended or adjusted under 35 U.S.C. 154(b) by 273 days.

This patent is subject to a terminal disclaimer.

(21) Appl. No.: 17/567,189

(22) Filed: Jan. 3, 2022

(65) Prior Publication Data

US 2022/0122356 A1 Apr. 21, 2022

Related U.S. Application Data

(63) Continuation of application No. 16/988,165, filed on Aug. 7, 2020, now Pat. No. 11,250,266.

(Continued)

(51) Int. Cl.
*G06V 40/16* (2022.01)
*G06F 16/51* (2019.01)
(Continued)

(52) U.S. Cl.
CPC .............. *G06F 21/32* (2013.01); *G06F 16/51* (2019.01); *G06F 16/56* (2019.01); *G06F 16/951* (2019.01);
(Continued)

(58) Field of Classification Search
CPC .......... G06F 21/32; G06F 16/51; G06F 16/56; G06F 16/951; G06F 18/214;
(Continued)

(56) References Cited

U.S. PATENT DOCUMENTS 5,550,928 A * 8/1996 Lu ..................... H04N 21/42201
382/116
5,842,194 A * 11/1998 Arbuckle ............. G06V 10/431
706/2

(Continued)

FOREIGN PATENT DOCUMENTS

CN 106022317 A 10/2016
WO 2019052917 A1 3/2019

OTHER PUBLICATIONS

Deng et al., "ArcFace: Additive Angular Margin Loss for Deep Face Recognition", 2019 IEEE/CVF Conference on Computer Vision and Pattern Recognition (CVPR) (Year: 2019).*

(Continued)

*Primary Examiner* — Aaron W Carter
(74) *Attorney, Agent, or Firm* — Fox Rothschild LLP

(57) ABSTRACT

This disclosure provides methods for providing information about a person based on facial recognition and various applications thereof, including face-based check-in, face-based personal identification, face-based identification verification, face-based background checks, facial data collaborative network, correlative face search, and personal face-based identification. The disclosed methods are able to provide accurate information about a person in a real-time manner.

20 Claims, 10 Drawing Sheets

Related U.S. Application Data

(60) Provisional application No. 62/884,766, filed on Aug. 9, 2019.

(51) Int. Cl.

| | | |
|---|---|---|
| *G06F 16/56* | (2019.01) | |
| *G06F 16/951* | (2019.01) | |
| *G06F 18/214* | (2023.01) | |
| *G06F 21/32* | (2013.01) | |
| *G06F 21/62* | (2013.01) | |
| *G06N 3/04* | (2023.01) | |
| *G06N 3/08* | (2023.01) | |
| *G06V 10/764* | (2022.01) | |
| *G06V 10/82* | (2022.01) | |
| *G06V 20/20* | (2022.01) | |
| *G06V 20/64* | (2022.01) | |
| *G06V 30/19* | (2022.01) | |
| *G06V 40/40* | (2022.01) | |
| *G06V 40/50* | (2022.01) | |
| *G07C 9/00* | (2020.01) | |

(52) U.S. Cl.
CPC ........ *G06F 18/214* (2023.01); *G06F 21/6245* (2013.01); *G06N 3/04* (2013.01); *G06N 3/08* (2013.01); *G06V 10/764* (2022.01); *G06V 10/82* (2022.01); *G06V 20/20* (2022.01); *G06V 20/647* (2022.01); *G06V 30/19147* (2022.01); *G06V 40/16* (2022.01); *G06V 40/166* (2022.01); *G06V 40/172* (2022.01); *G06V 40/45* (2022.01); *G06V 40/50* (2022.01); *G07C 9/00563* (2013.01)

(58) Field of Classification Search
CPC ........ G06F 21/6245; G06N 3/04; G06N 3/08; G06N 3/045; G06N 20/00; G06V 10/764; G06V 10/82; G06V 20/20; G06V 20/647; G06V 30/19147; G06V 40/16; G06V 40/166; G06V 40/172; G06V 40/45; G06V 40/50; G07C 9/00563; G07C 9/38; G07C 9/37

See application file for complete search history.

(56) References Cited

U.S. PATENT DOCUMENTS

| | | | |
|---|---|---|---|
| 6,829,711 B1* | 12/2004 | Kwok | G06Q 20/363 |
| | | | 713/176 |
| 7,804,982 B2 | 9/2010 | Howard et al. | |
| 8,457,367 B1 | 6/2013 | Sipe et al. | |
| 8,752,145 B1* | 6/2014 | Dotan | G06F 21/32 |
| | | | 726/8 |
| 9,165,040 B1 | 10/2015 | Hajaj | |
| 9,317,530 B2 | 4/2016 | Papakipos et al. | |
| 9,530,047 B1 | 12/2016 | Tang et al. | |
| 9,934,424 B2 | 4/2018 | Bostick et al. | |
| 10,133,951 B1 | 11/2018 | Mendonca et al. | |
| 10,289,897 B2* | 5/2019 | Tang | G06V 10/20 |
| 10,552,471 B1 | 2/2020 | Dandekar et al. | |
| 10,579,669 B2 | 3/2020 | Kojima et al. | |
| 10,810,816 B1 | 10/2020 | Kocher et al. | |
| 11,080,316 B1* | 8/2021 | Das | G06F 16/434 |
| 11,250,266 B2* | 2/2022 | Ton-That | G06V 40/45 |
| 11,443,553 B1* | 9/2022 | Liu | G06V 10/762 |
| 2002/0176610 A1 | 11/2002 | Okazaki et al. | |
| 2003/0107472 A1 | 6/2003 | Ogihara et al. | |
| 2003/0123713 A1 | 7/2003 | Geng | |
| 2003/0133599 A1* | 7/2003 | Tian | G06V 40/175 |
| | | | 382/118 |
| 2005/0276452 A1 | 12/2005 | Boland | |
| 2005/0280502 A1 | 12/2005 | Bell | |
| 2006/0120571 A1 | 6/2006 | Tu et al. | |
| 2006/0239515 A1 | 10/2006 | Zhang et al. | |
| 2006/0287766 A1 | 12/2006 | Kraft | |
| 2007/0127787 A1 | 6/2007 | Castleman et al. | |
| 2008/0130960 A1 | 6/2008 | Yagnik | |
| 2008/0313726 A1* | 12/2008 | Gardner | H04L 9/3273 |
| | | | 726/9 |
| 2009/0060289 A1 | 3/2009 | Shah et al. | |
| 2009/0271296 A1 | 10/2009 | Romero | |
| 2010/0008547 A1 | 1/2010 | Yagnik et al. | |
| 2011/0064302 A1 | 3/2011 | Ma et al. | |
| 2011/0116690 A1 | 5/2011 | Ross et al. | |
| 2011/0164792 A1 | 7/2011 | Yoon et al. | |
| 2011/0302100 A1 | 12/2011 | Selvakummar | |
| 2012/0054691 A1 | 3/2012 | Nurmi | |
| 2012/0242840 A1 | 9/2012 | Nakfour et al. | |
| 2013/0036110 A1 | 2/2013 | Scott et al. | |
| 2013/0243272 A1 | 9/2013 | Hanzawa et al. | |
| 2014/0079298 A1 | 3/2014 | Shah et al. | |
| 2014/0222596 A1* | 8/2014 | S | G06Q 20/20 |
| | | | 705/18 |
| 2014/0289323 A1 | 9/2014 | Kutaragi et al. | |
| 2014/0294257 A1 | 10/2014 | Tussy | |
| 2014/0328521 A1 | 11/2014 | Colangelo | |
| 2015/0016687 A1 | 1/2015 | Wang et al. | |
| 2015/0199401 A1 | 7/2015 | Polehn et al. | |
| 2015/0199403 A1 | 7/2015 | Naba | |
| 2015/0268470 A1 | 9/2015 | Yang | |
| 2015/0317452 A1 | 11/2015 | Kozuka et al. | |
| 2016/0094756 A1 | 3/2016 | Onishi | |
| 2016/0132720 A1 | 5/2016 | Klare et al. | |
| 2016/0196467 A1 | 7/2016 | Xia | |
| 2017/0337365 A1 | 11/2017 | Kikinis | |
| 2018/0005018 A1 | 1/2018 | Young et al. | |
| 2018/0082304 A1 | 3/2018 | Summerlin et al. | |
| 2018/0101742 A1 | 4/2018 | Burge et al. | |
| 2018/0220043 A1 | 8/2018 | Sun et al. | |
| 2018/0292980 A1 | 10/2018 | Noro et al. | |
| 2018/0341835 A1 | 11/2018 | Siminoff | |
| 2018/0374101 A1* | 12/2018 | Coelho | G06V 40/172 |
| 2019/0087889 A1 | 3/2019 | Rice | |
| 2019/0095698 A1 | 3/2019 | Cole et al. | |
| 2019/0137261 A1 | 5/2019 | Sabitov et al. | |
| 2019/0171868 A1* | 6/2019 | Taigman | G06V 40/172 |
| 2019/0231190 A1 | 8/2019 | Kozuka et al. | |
| 2019/0303651 A1 | 10/2019 | Gallagher et al. | |
| 2019/0354750 A1 | 11/2019 | Nazemi et al. | |
| 2019/0392659 A1 | 12/2019 | Seenivasagam et al. | |
| 2020/0026906 A1 | 1/2020 | Ajiki et al. | |
| 2020/0065563 A1* | 2/2020 | Zou | G06N 3/045 |
| 2020/0249764 A1 | 8/2020 | Page et al. | |
| 2020/0311390 A1 | 10/2020 | Tan et al. | |
| 2020/0327308 A1* | 10/2020 | Cheng | G06F 18/253 |
| 2020/0410214 A1* | 12/2020 | Huang | G06V 40/168 |
| 2021/0012094 A1* | 1/2021 | Yang | G06V 10/764 |
| 2021/0042527 A1* | 2/2021 | Ton-That | G06F 18/214 |
| 2022/0122356 A1* | 4/2022 | Ton-That | G06F 21/32 |
| 2023/0157675 A1* | 5/2023 | Erez | G16H 50/20 |
| | | | 250/370.09 |

OTHER PUBLICATIONS

Data Mining: Practical Machine Learning Tools and Techniques, Fourth Edition. Ian H. Witten, Eibe Frank, Mark A. Hall, Christopher J Pal. Morgan Kaufmann an imprint of Elsevier, Publisher. Cambridge, MA, 2017. ISBN:978-0-12-804291-5. Chapter 3.5, pp. 84-87.†

\* cited by examiner
† cited by third party

METHODS FOR PROVIDING INFORMATION ABOUT A PERSON BASED ON FACIAL RECOGNITION

CROSS-REFERENCE TO RELATED APPLICATIONS

This application is a continuation of U.S. patent application Ser. No. 16/988,165, filed Aug. 7, 2020, which claims priority under 35 U.S.C. § 119(e) to U.S. Provisional Patent Application No. 62/884,766, filed Aug. 9, 2019. The foregoing application is incorporated by reference herein in its entirety.

FIELD OF THE INVENTION

This invention relates to methods and systems for providing information about a person based on facial recognition.

BACKGROUND OF THE INVENTION

In many instances, it may be desirable for an individual to know more about a person that they meet, such as through business, dating, or other relationship. There are many traditional methods to learn about a new person. For example, some of these methods are to ask about the person's background or history, or to receive documentation such as business cards from the person. However, the information provided by the person and this information, either oral or written, could be false. The individual would have little way of determining if the information was accurate or false. Alternatively, one may research the newly met person on a web site or to perform background checks. However, there are many instances when a person can assume a new name or identity to present a false name and history to the individual. As a result, even the best search would not yield accurate results.

In some situations, the individual needs to know the information about a newly met person right away to determine whether the person is being honest or has the background as asserted. The existing methods are unable to rapidly provide accurate information about the individual. For example, a traditional background check can take from three days to one month. Such delay often renders the obtained information about the person inaccurate and not useful.

Therefore, a strong need exists for an improved method and system to obtain information about a person and selectively provide the information based on predetermined criteria.

SUMMARY OF THE INVENTION

This disclosure addresses the need mentioned above in a number of aspects. In one aspect, this disclosure presents a method for providing information about a person (e.g., an unknown person, a newly met person, a person with deficient memory). The method includes: (i) receiving facial image data transmitted from a user device. The facial image data comprises at least a captured facial image of the subject; (ii) transforming the facial image data to facial recognition data; (iii) comparing by a server device the facial recognition data to reference facial recognition data associated with a plurality of stored facial images of individuals to identify at least one likely candidate matching the captured facial image; (iv) upon identification of the candidate matching the captured facial image, retrieving from the database personal information (e.g., biography, profile information) associated with the candidate; and (v) transmitting the personal information to the user device and causing the user device to display the personal information.

In some embodiments, the method includes preprocessing an image of the subject by the user device. Preprocessing may include detecting a facial image in the image of the subject by the user device. Preprocessing may also include cropping, resizing, gradation conversion, median filtering, histogram equalization, or size normalized image processing. In some embodiments, the facial image is captured by a camera-enabled user device. In some embodiments, the user device is provided in a customized enclosure with an opening for the camera. In some embodiments, the image is captured by a network camera. In some embodiments, the image is imported from a second user device. In some embodiments, the subject is a person. In some embodiments, the subject is a criminal. In some embodiments, the facial image data comprise a three-dimensional facial image of the subject.

In some embodiments, the method further includes: (i) downloading by a web crawler facial images of individuals and personal information associated therewith; and (2) storing the downloaded facial images and associated personal information in the database. In some embodiments, the reference facial recognition data comprise the facial images downloaded by the web crawler. The reference facial recognition data may include the facial images obtained from the Internet, professional websites, law enforcement websites, or departments of motor vehicles. In some embodiments, the database comprises a plurality of criminal records associated with the facial images stored in the database.

In some embodiments, the facial recognition data include a vector representation of the captured facial image of the subject. Similarly, the reference facial recognition data may also include a vector representation of the stored facial image in the database. In some embodiments, the vector representation comprises a 512 point vector or a 1024×1024 facial data matrix.

In some embodiments, the step of comparing further comprises comparing the vector representation of the captured facial image of the subject to a vector representation associated with the stored facial images in the database. Comparing the facial recognition data can be performed by a machine learning module. The machine learning module comprises a deep convolutional neural network (CNN). In some embodiments, identification of the candidate is performed by the k-nearest neighbor algorithm (k-NN).

In some embodiments, the method may further include detecting a liveness gesture. The liveness gesture is based on at least one of a yaw angle of a second image relative to a first image and a pitch angle of the second image relative to the first image, wherein the yaw angle corresponds to a transition centered around a vertical axis, and wherein the pitch angle corresponds to a transition centered around a horizontal axis.

In some embodiments, the personal information is retrieved from the database based on a predetermined privacy setting of the identified candidate. In some embodiments, the method further includes displaying one or more facial images of the identified candidate and the personal information associated therewith. In some embodiments, the method may also include transmitting a notification to the user device if the identified candidate poses a high risk to the public or is a criminal. In some embodiments, the personal information may include a name of the identified candidate.

In some embodiments, the personal information may include a link to an online profile associated with the identified match. In some embodiments, the personal information transmitted to the user device is obtained from a webpage having the highest PageRank value among the webpages containing the personal information.

In some embodiments, the method also includes: (i) determining permission of access for the subject to a venue or an account based on the personal information of the identified candidate; (ii) granting the access for the subject if the identified candidate is an authorized user, or denying the access for the subject if the identified candidate is not an authorized user or a candidate matching the captured facial image cannot be identified; and (iii) transmitting a message indicative of granting or denying the access to the venue or the account. In some embodiments, the account is associated with a bank, a financial institute or a credit company.

In some embodiments, the method additionally includes providing access to the database to a plurality of users. The plurality users may be located in the same geographic area or associated with the same business type.

In some embodiments, the facial image data include a second captured facial image of a second subject. In some embodiments, the method includes identifying a relationship between two or more subjects having facial images captured in a single image.

In another aspect, this disclosure provides a method for verifying an identity of a user. The method includes: (a) providing a facial image data comprising a captured facial image and a personal identification number of the user; (b) transforming the facial image data to facial recognition data; (c) comparing the facial recognition data and the personal identification number to reference facial recognition data and reference personal identification numbers associated with a plurality of stored facial images of individuals to identify at least one likely candidate matching the captured facial image and the personal identification number; and (d) upon identification of the candidate, transmitting a confirmation to a user device indicating the user is an authorized user.

In another aspect, this disclosure also presents a system for providing information about a subject. The system includes: (i) a facial image processing module operable to transform a captured facial image of the subject to a facial recognition data; and (ii) a facial recognition module operable to: (a) compare the facial recognition data to reference facial recognition data associated with a plurality of stored facial images of individuals to identify at least one likely candidate matching the captured facial image, (b) upon identification of the candidate matching the captured facial image, retrieve from the database personal information associated with the candidate, and (c) transmit the personal information to the user device and cause the user device to display the personal information.

In some embodiments, the system includes a plurality of imaging devices, wherein each of the plurality of imaging devices is operable to capture at least one image comprising a face of the subject to generate a captured image. The plurality of imaging devices is wirelessly coupled to a monitoring station that stores the plurality of stored images.

In yet another aspect, this disclosure provides a method of providing security. The method includes (i) providing imaging devices in a plurality of areas through which individuals pass, wherein the imaging devices are operable to obtain facial images of each of the individuals; and (ii) performing facial recognition by the system as described above.

In some embodiments, the facial image processing module is operable to preprocess an image of the subject by the user device. Preprocessing may include detecting a facial image in the image of the subject by the user device. Preprocessing may also include cropping, resizing, gradation conversion, median filtering, histogram equalization, or size normalized image processing. In some embodiments, the facial image is captured by a camera-enabled user device. In some embodiments, the user device is provided in a customized enclosure with an opening for the camera. In some embodiments, the image is captured by a network camera. In some embodiments, the image is imported from a second user device. In some embodiments, the subject is a person. In some embodiments, the subject is a criminal. In some embodiments, the facial image data comprise a three-dimensional facial image of the subject.

In some embodiments, the facial image processing module is operable to: (i) download by a web crawler facial images of individuals and personal information associated therewith; and (ii) store the downloaded facial images and associated personal information in the database.

In some embodiments, the reference facial recognition data comprise the facial images downloaded by the web crawler. The reference facial recognition data may include the facial images obtained from the Internet, professional websites, law enforcement websites, or departments of motor vehicles. In some embodiments, the database comprises a plurality of criminal records associated with the facial images stored in the database.

In some embodiments, the facial recognition data include a vector representation of the captured facial image of the subject. Similarly, the reference facial recognition data may also include a vector representation of the stored facial image in the database. In some embodiments, the vector representation comprises a 512 point vector or a 1024×1024 facial data matrix.

In the system as described above, the facial recognition module is operable to compare the vector representation of the captured facial image of the subject to a vector representation associated with the stored facial images in the database. Comparing the facial recognition data can be performed by a machine learning module. The machine learning module comprises a deep convolutional neural network (CNN). In some embodiments, identification of the candidate is performed by the k-nearest neighbors algorithm (k-NN).

In some embodiments, the method may further include detecting a liveness gesture. The liveness gesture is based on at least one of a yaw angle of a second image relative to a first image and a pitch angle of the second image relative to the first image, wherein the yaw angle corresponds to a transition centered around a vertical axis, and wherein the pitch angle corresponds to a transition centered around a horizontal axis.

In some embodiments, the personal information is retrieved from the database based on a predetermined privacy setting of the identified candidate. In some embodiments, the method further includes displaying one or more facial images of the identified candidate and the personal information associated therewith. In some embodiments, the method may also include transmitting a notification to the user device if the identified candidate poses a high risk to the public or is a criminal. In some embodiments, the personal information may include a name of the identified candidate. In some embodiments, the personal information may include a link to an online profile associated with the identified match. In some embodiments, the personal information transmitted to the user device is obtained from a webpage having the highest PageRank value among the webpages containing the personal information.

In some embodiments, the facial recognition module is operable to: (i) determine a permission of access for the subject to a venue or an account based on the personal information of the identified candidate; (ii) grant the access for the subject if the identified candidate is an authorized user, or deny the access for the subject if the identified candidate is not an authorized user or the candidate matching the captured facial image cannot be identified; and (iii) transmit a message indicative of granting or denying the access to the venue or the account. In some embodiments, the account may be associated with a bank, a financial institute or a credit company.

In some embodiments, the facial recognition module is operable to provide access to the database to a plurality of users. The plurality users may be located in the same geographic area or associated with the same business type.

In some embodiments, the facial image data include a second captured facial image of a second subject. In some embodiments, the method includes identifying a relationship between two or more subjects having facial images captured in a single image.

In another aspect, this disclosure provides a system for verifying an identity of a user. The system includes (i) a facial image processing module operable to transform a captured facial image of the subject to a facial recognition data; and (ii) a facial recognition module operable to: (a) provide a facial image data comprising a captured facial image and a personal identification number of the user; (b) transform the facial image data to facial recognition data; (c) compare the facial recognition data and the personal identification number to reference facial recognition data and reference personal identification numbers associated with a plurality of stored facial images of individuals to identify at least one likely candidate matching the captured facial image and the personal identification number; and (d) upon identification of the candidate, transmit a confirmation to a user device indicating the user is an authorized user.

The foregoing summary is not intended to define every aspect of the disclosure, and additional aspects are described in other sections, such as the following detailed description. The entire document is intended to be related as a unified disclosure, and it should be understood that all combinations of features described herein are contemplated, even if the combination of features are not found together in the same sentence, or paragraph, or section of this document. Other features and advantages of the invention will become apparent from the following detailed description. It should be understood, however, that the detailed description and the specific examples, while indicating specific embodiments of the disclosure, are given by way of illustration only, because various changes and modifications within the spirit and scope of the disclosure will become apparent to those skilled in the art from this detailed description.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE INVENTION

This disclosure provides methods for providing information about a person based on facial recognition and various applications thereof, including face-based check-in, face-based personal identification, face-based identification verification, face-based background checks, facial data collaborative network, correlative face search, and personal face-based identification. The disclosed methods are able to provide accurate information about a person in a real-time manner.

Figure 1:
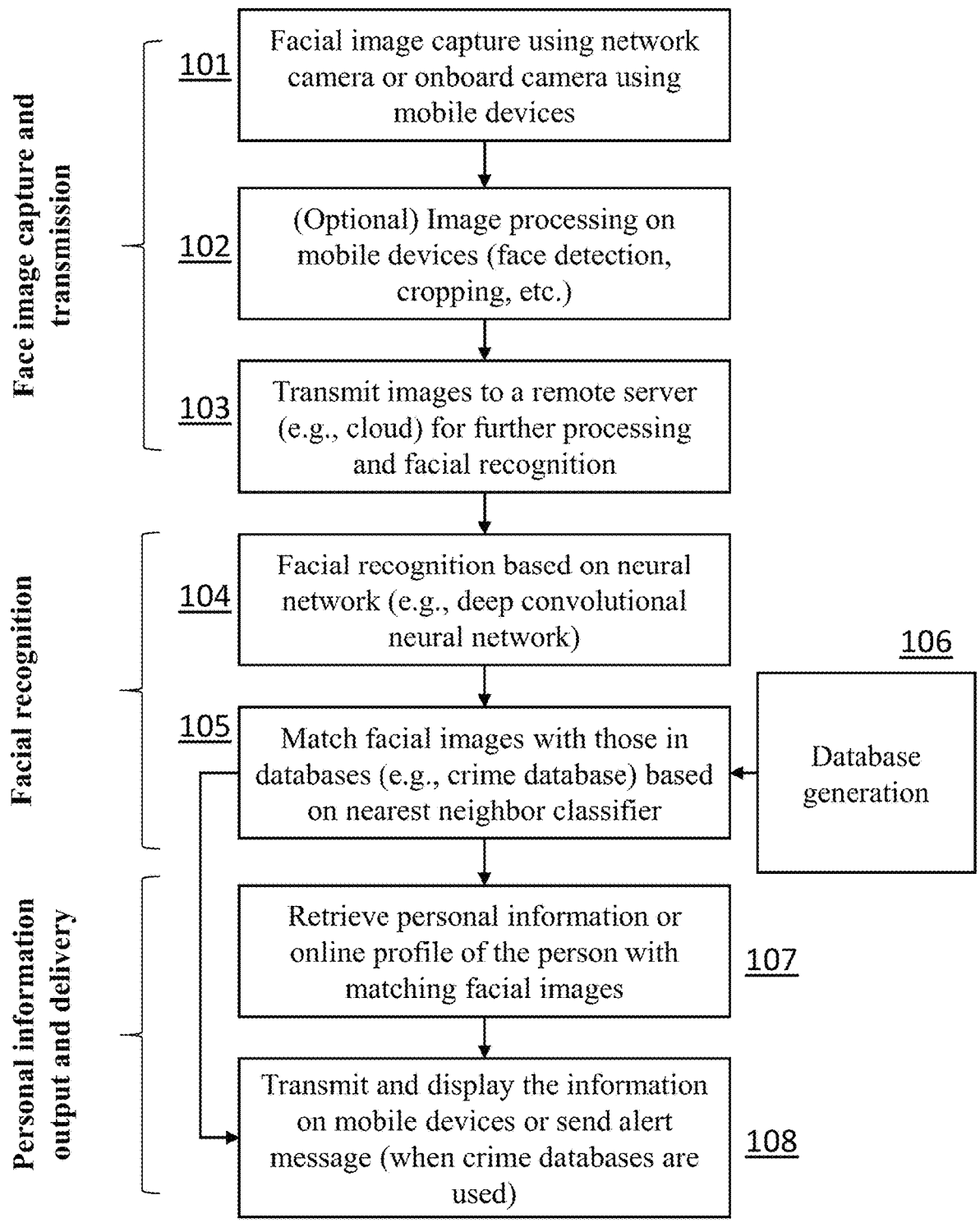
FIG. 1 shows an example method for providing information about a person based on facial recognition.
Figure 2:
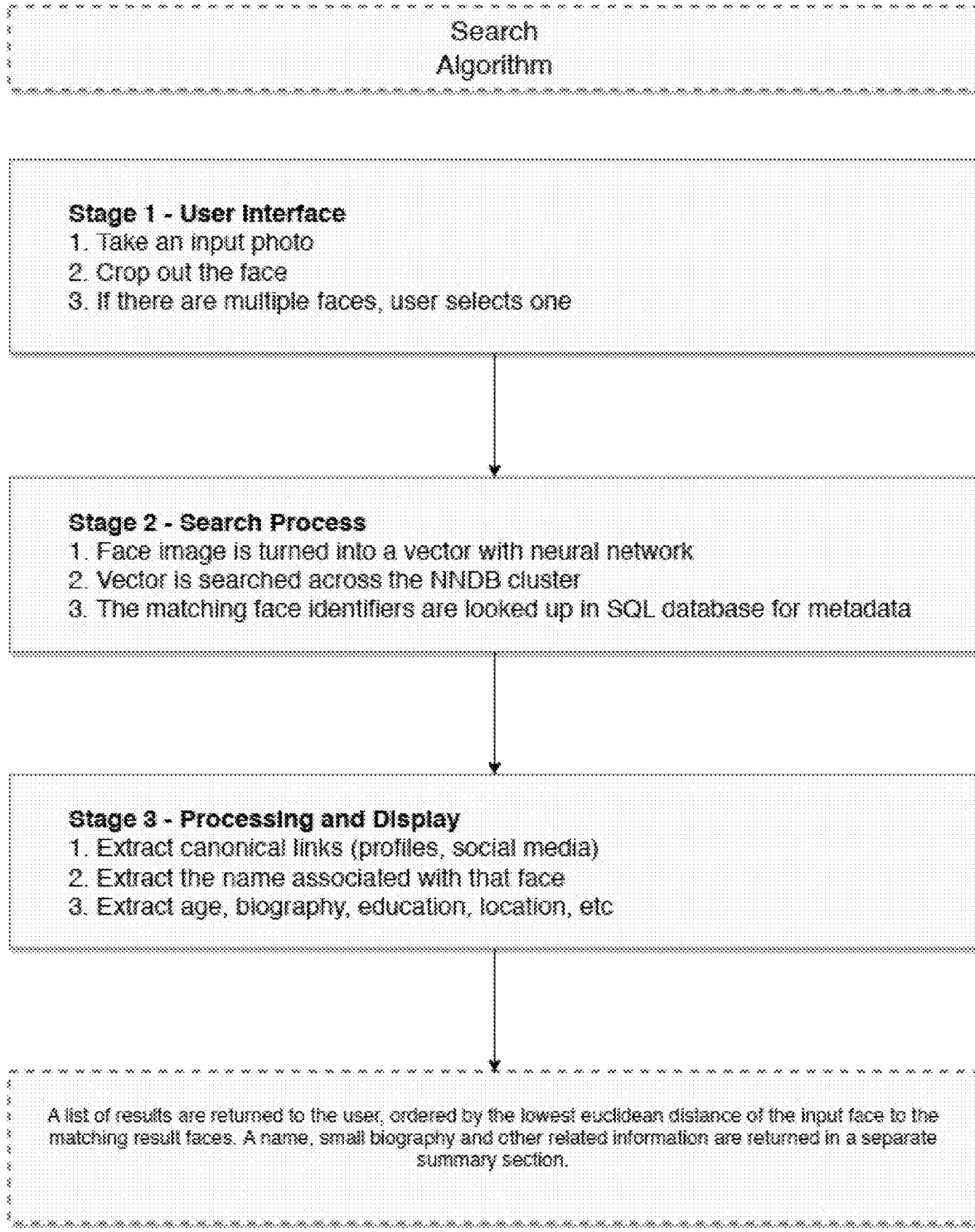
FIG. 2 shows an example process for providing information about a person based on input images.

A. Methods and Systems for Obtaining Personal Information Based on Facial Recognition In one aspect, this disclosure presents a method for providing information about a subject (e.g., a person, an unknown person, a newly met person, a person with deficient memory, a criminal, an intoxicated person, a drug user, a homeless person). As shown in FIGS. 1 and 2, the method includes (i) receiving facial image data transmitted from a user device. The facial image data comprises at least a captured facial image of the subject; (ii) transforming the facial image data to facial recognition data; (iii) comparing by a server device the facial recognition data to reference facial recognition data associated with a plurality of stored facial images of individuals to identify at least one likely candidate matching the captured facial image; (iv) upon identification of the candidate matching the captured facial image, retrieving from the database personal information associated with the candidate; and (v) transmitting the personal information to the user device and causing the user device to display the personal information.

Also provided is a system implementing the above-described method for providing personal information about a subject. Referring again to FIG. 1, at 101, the system may capture a facial image of a subject by a network camera or an onboard camera of a user device (e.g., mobile device). At 102, the system may optionally preprocess the captured facial images on the user device. At 103, the system may transmit the facial images (e.g., preprocessed) facial images to a server device for additional processing and performing facial recognition. At 104, the system may perform facial recognition based on a neural network algorithm (e.g., deep convolutional neural network (CNN)). At 105, the system may match the facial images with the facial images stored in databases (provided at 106). The image matching can be performed based on a nearest neighbor search, such as a k nearest neighbor (k-NN) algorithm, to identify one or more candidate images. The candidate images match the captured facial images based on one or more predetermined criteria. At 107, the system may retrieve personal information of the one or more candidate images. The personal information may include an online profile of the subject on a social networking website, a professional networking website, or an employer website. At 108, the system transmits and causes the user device to display the retrieved personal information. Alternatively and/or additionally, the system may also cause the user device to display an alert message, based on, for example, a potential risk to the public posed by the subject.

The disclosed system can be operated via desktop or remotely via smartphone, enabling users who conduct criminal investigations, background checks, etc. to instantly establish the identify and obtain biographical data on individuals via one or more facial databases with supplemental links to social media, conventional media, professional websites, etc. In the process of instantly matching a face via the facial database, the system also finds and posts the name of the individual being searched. The system also instantly posts live links to the individual's publicly accessible social media, conventional media, etc.

Unless specifically stated otherwise as apparent from the above discussion, it is appreciated that throughout the description, discussions utilizing terms such as "processing" or "computing" or "calculating" or "determining" or "identifying" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Figure 9:
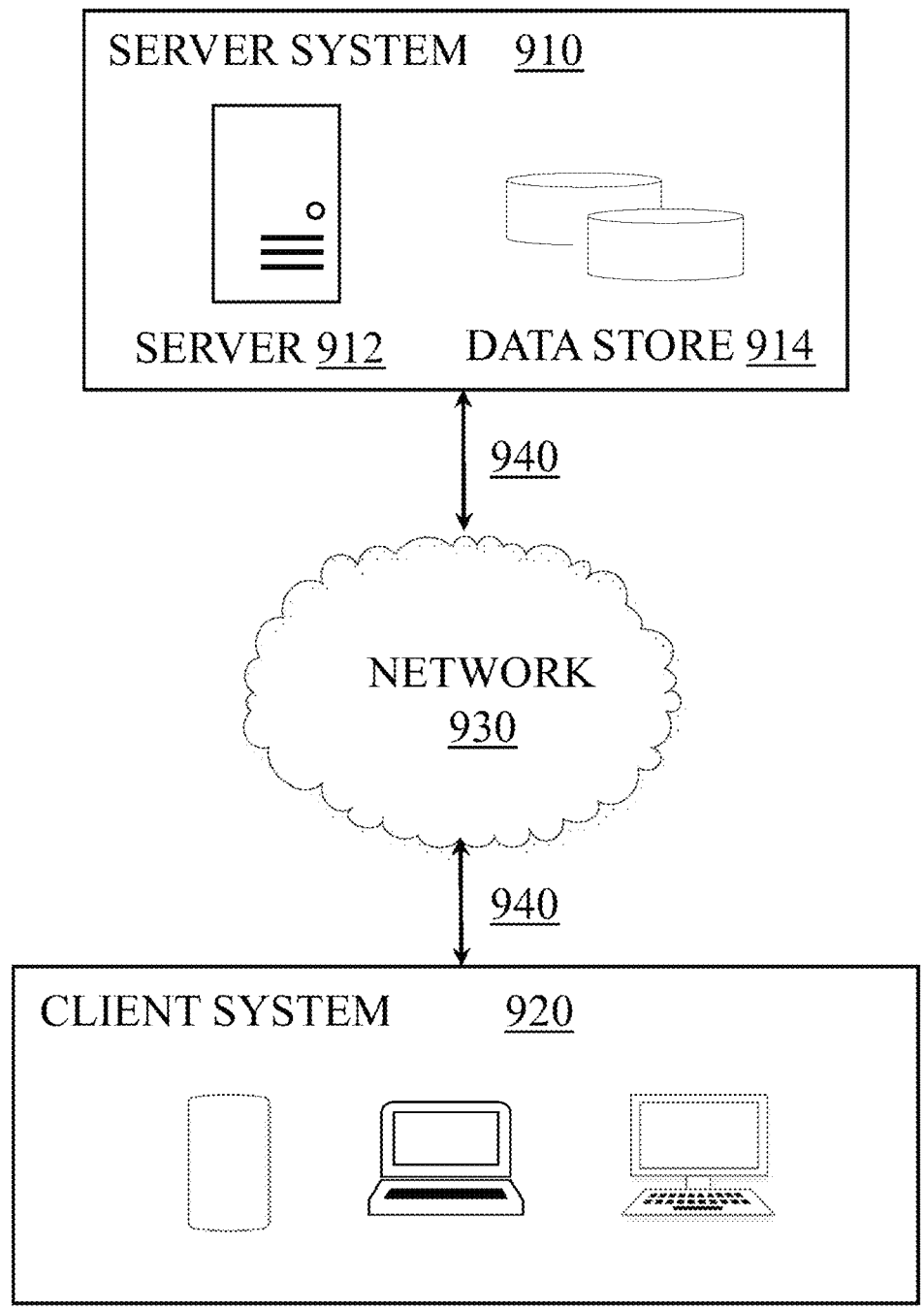
FIG. 9 shows an example system for implementing the disclosed methods.

The system may transmit and display the information about a person on a user device embedding a client system 920 (also see FIG. 9). The user device may be an electronic device including hardware, software, or embedded logic components or a combination of two or more such components and capable of carrying out the appropriate functionalities implemented or supported by the client systems. As an example and not by way of limitation, a client system may include a computer system such as a desktop computer, notebook or laptop computer, netbook, a tablet computer, handheld electronic device, cellular telephone, smartphone, other suitable electronic device, or any suitable combination thereof. A client system may enable a network user at the client system to access the network. A client system may enable its user to communicate with other users at other client systems.

Figure 3:
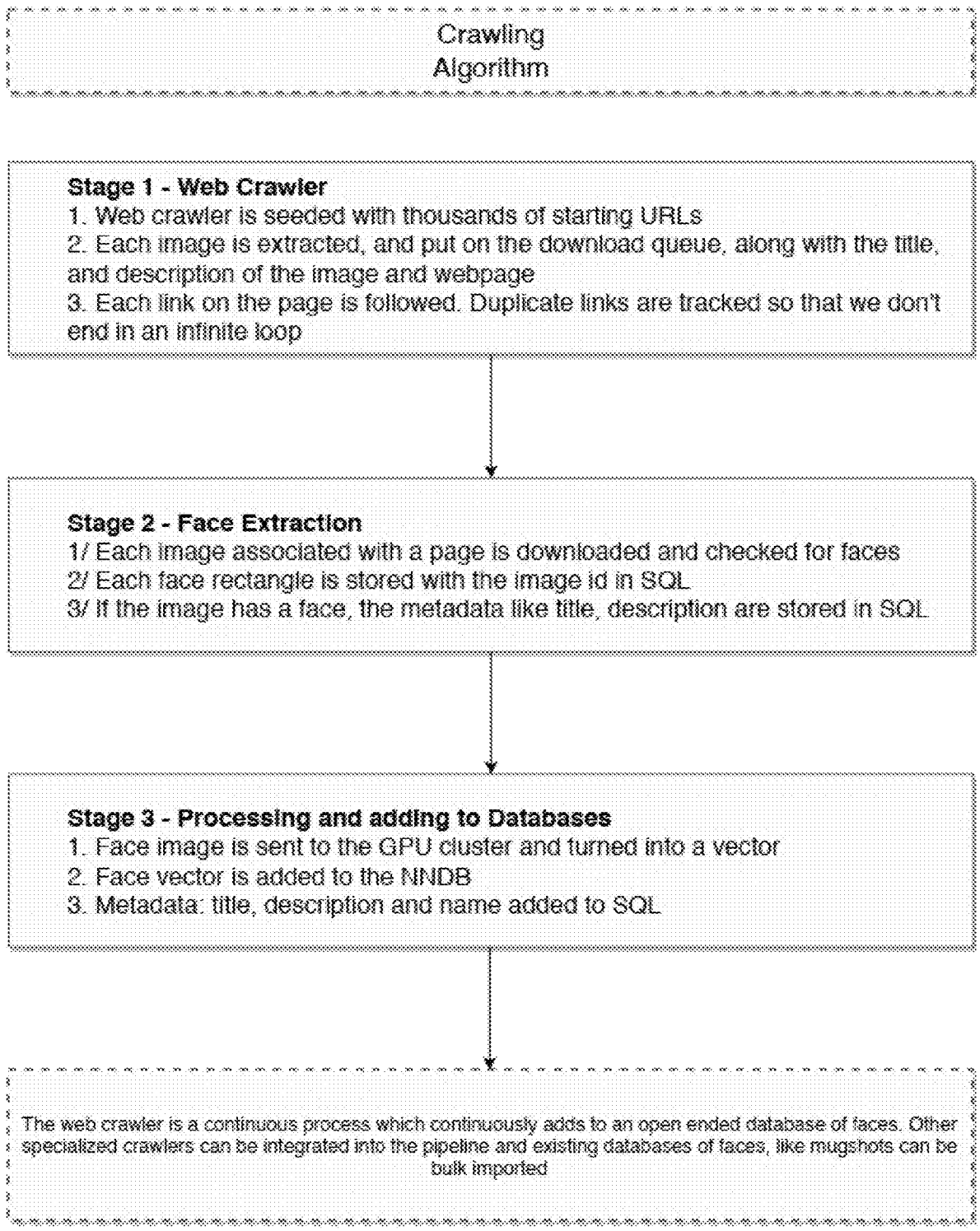
FIG. 3 shows an example process for retrieving facial images of a person and other related information from the Internet using a web crawler.
Figure 4:
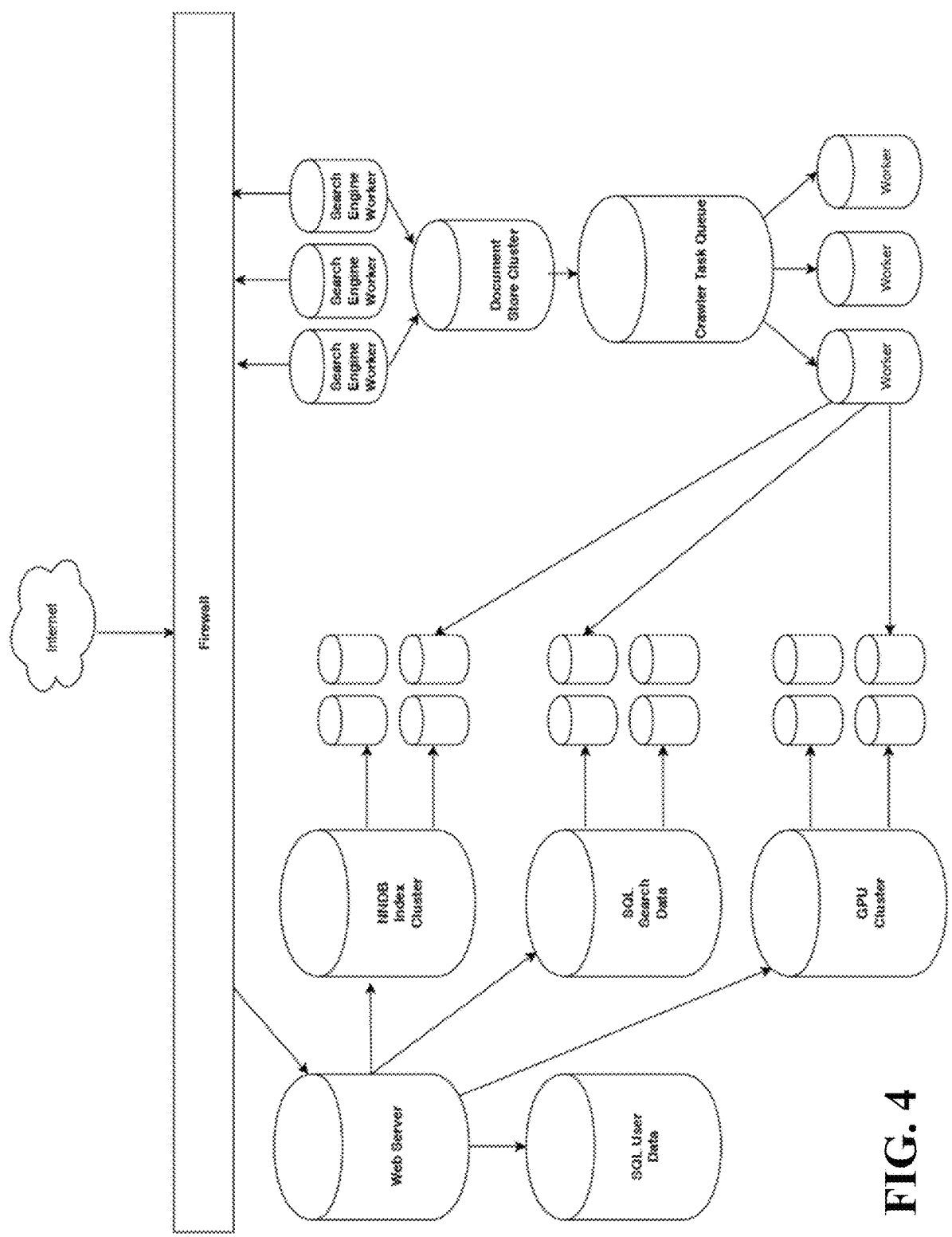
FIG. 4 shows an example server side implementation of the disclosed methods.

FIG. 3 shows an example of the server side implementation for providing the information about a person. For example, the system may include a firewall to safeguard the security of the communication between server devices and client devices over the Internet. For the web crawling function, the system may include one or more search engine workers, which scan various websites and identifies images containing facial images and other information. The system may store the identified images and other information in a document store cluster. The web crawling tasks are organized in a crawler task queue. The information retrieved by the web crawler can then be indexed and stored in databases to support later searches in response to user inputs. For the web searching function, the system may include web server which handles the requests received from user devices and transmits the results to the user devices, by interacting with database(s) for SQL user data, database(s) for SQL search data, NNDB index cluster(s), and GPU cluster(s).

B. Image Capturing and Processing

The system may include a camera (still, video, or both) for capturing facial images. Non-limiting examples of cameras include cameras installed on a user device, network or web cameras, USB cameras, analog or digital cameras, internet protocol (IP) cameras, analog or digital video cameras, closed-circuit cameras (CCTV), etc. In some embodiments, the system may employ a network camera server, another type of network camera. The network camera receives an image signal from a plurality of cameras comprising a lens and image sensor and each being separated in a place outside and converts it to one united image signal to transmit it through a network, and performs a network server function for the image signal photographed by a plurality of cameras. The above stated network camera or network camera server has its own unique IP and has a function of transmitting the obtained image signal through a network at high speed of the minimum 10 frames to the maximum 30 frames per second in a compression method of JPEG or M-JPEG, Wavelet compression method, or MPEG compression method using a standard web browser without an additional PC. The system can also include a surveillance camera adapted to be connected to an internet protocol network. In some embodiments, the facial recognition technology can be incorporated into a networked surveillance system.

In some embodiments, the facial image is captured by a camera-enabled user device. In some embodiments, the image is captured by a network camera. In some embodiments, the image is imported from a second user device. In some embodiments, the camera can be enclosed in a customized case. The customized case is designed to entirely enclose and protect a user device, such as iPhones and Android phones, with an opening for the phone's camera lens. The case is designed to be mounted on a stand-alone base in the wall of a lobby, hallway or doorway. The case fabricated in metal or plastic.

Figure 5:
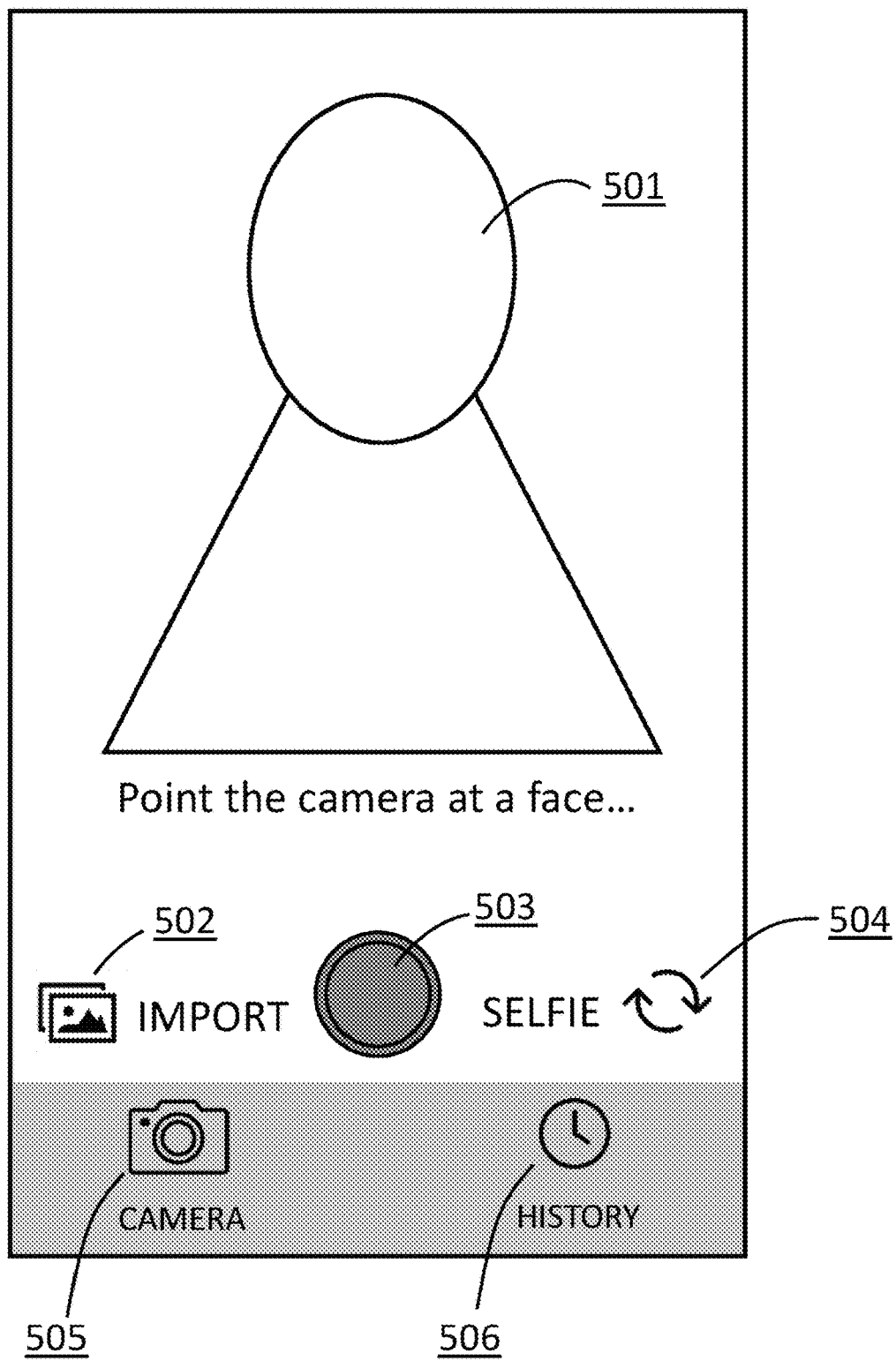
FIG. 5 shows an example interface of a search application on a mobile device displaying candidate images in the databases matching the captured facial images.

FIG. 5 shows an example interface of a search application on a user device (e.g., mobile device) for capturing facial images of a person. The interface 500 includes one or more icons to receive user inputs to invoke certain functions of the user device. For example, the system may invoke a camera function of the user device and allow the user to take photos or videos, or uploading photos or videos obtained elsewhere. A user may choose to use an onboard camera of the mobile device to capture a facial image using a front-facing camera 504 or a rear-facing camera 505. The interface may also include a marked area 501 to help the user to locate the face of the subject in a designated area of the interface 500 to ensure a good quality of the captured facial images. In some embodiments, the system may allow the user to upload a photo or a video (502). The photo or video may be retrieved from a photo/video gallery or library of the user device.

In some embodiments, the system may preprocess an image of the subject by the user device or by a camera. The term "image" or "images," as used herein, refers to single or multiple frames of still or animated images, video clips, video streams, etc. Preprocessing may include detecting a facial image in the image of the subject by the user device. Preprocessing may also include cropping, resizing, gradation conversion, median filtering, histogram equalization, or size normalized image processing.

In some embodiments, the system may resize the photo or the videos according to a threshold value (e.g., maximum size in kilobytes, megabytes or gigabytes, maximum or minimum resolution in dots per inch (DPI) or pixels per inch (PPI)). In some embodiments, the system may resize the photo or the videos based on the transmission rate of the network and the links.

In some embodiments, the system may perform additional processing steps by cameras, user devices, or server devices, to the captured images or videos to digitalize the data file and optionally compress into a convenient compressed file format, and sent to a network protocol stack for subsequent conveyance over a local or wide area network. Typical compression schemes include MPEG, JPEG, H.261 or H.263, wavelet, or a variety of proprietary compression schemes. A typical network topology is the popular Ethernet standard, IEEE 802.3, and may operate at speeds from 10 Mb/s to 100 Mb/s. Network protocols are typically TCP/IP, UDP/IP, and may be Unicast or Multicast as dictated by the system requirements.

C. Facial Images Databases

The system may include one or more databases or database interfaces to facilitate communication with and searching of databases. For example, the system may include an image database that contains images or image data for one or more people. The system may also include a database interface that may be used to access image data of third parties (e.g., law enforcement, DMV) as part of the identity match process. Also part of the system is a personal data database that stores profile information of one or more people. The profile information may include at least one of: a name, a gender, a date of birth or age, a nationality, a correspondence language, a civic address, a phone number, an email address, an instant messaging identifier, and financial information. The profile information may also include a link to a webpage on a website containing the information related to a person of interest. For example, the website can be a social networking website, a professional networking website, a personal website, or an employer website. The system may include a privacy settings module that operates to establish a privacy setting for individuals to access a database.

The image database or the personal data database may be a relational, columnar, correlation, or other suitable databases. The databases can be local or distributed. For example, In some embodiments, the databases can be hosted on by a cloud service provider (e.g., Amazon AWS, Google Cloud, Microsoft Azure). Although this disclosure describes or illustrates particular types of databases, this disclosure contemplates any suitable types of databases.

Figure 6:
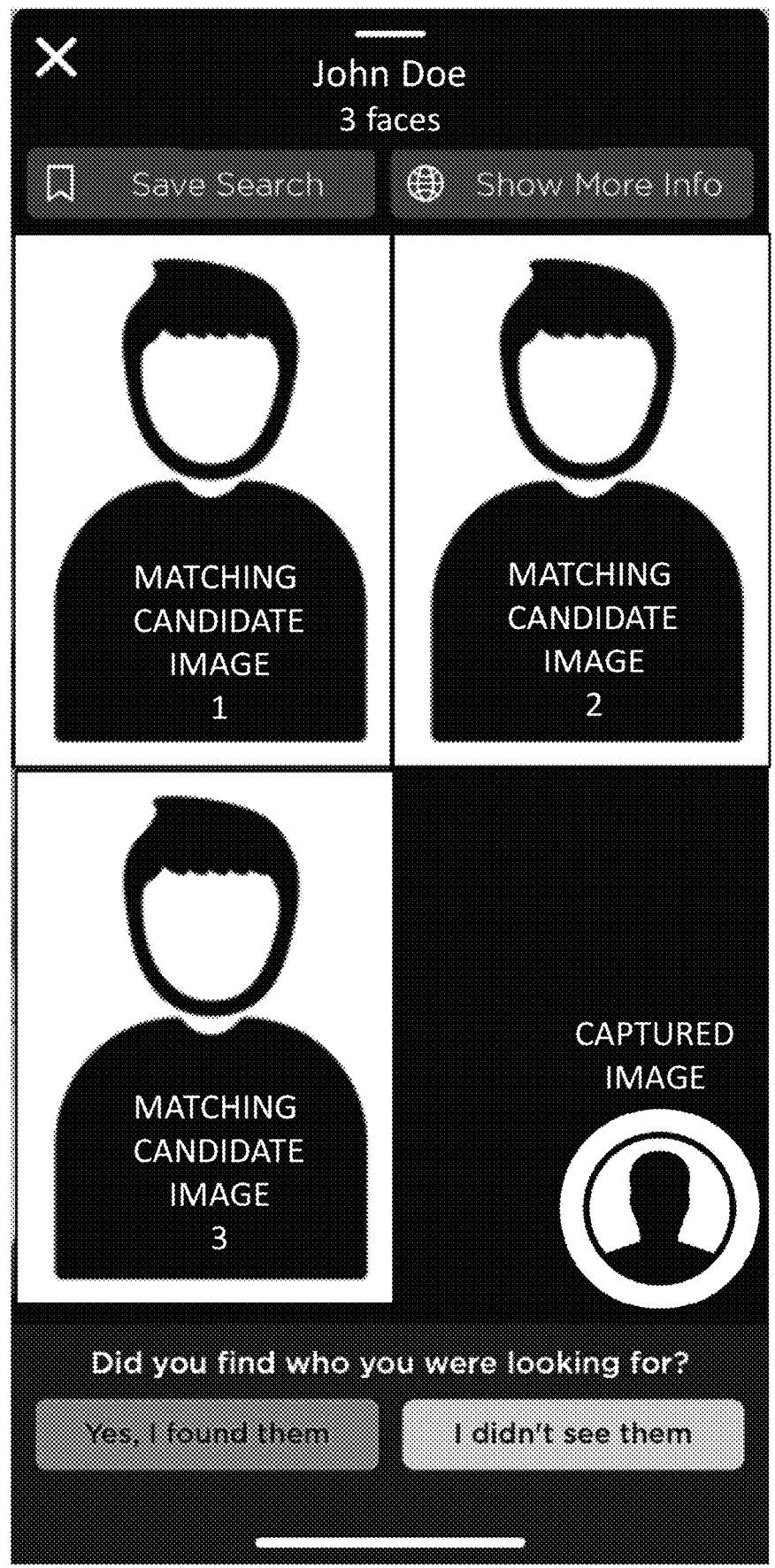
FIG. 6 shows an example interface showing candidate facial images identified by the search.

FIG. 6 shows an example process for the system to acquire facial images and other related information of a person from the Internet using, for example, a web crawler. Much of the information about an identified individual can be obtained through public means and scanning social networking websites, such as Facebook and Google+, or professional networking websites, such as LinkedIn. Online photos associated with a person's account may help to create additional records of facial recognition data points. In some embodiments, the system may (i) download by a web crawler facial images of individuals and personal information associated therewith; and (2) store the downloaded facial images and associated personal information in the database. In some embodiments, the reference facial recognition data comprise the facial images downloaded by the web crawler. The reference facial recognition data may include the facial images obtained from the Internet, professional websites, law enforcement websites, or departments of motor vehicles. In some embodiments, the database comprises a plurality of criminal records associated with the facial images stored in the database.

After downloading and storing the facial images, the system may classify the images based on one or more criteria. Thus, the database may also store the image information, including at least one of already classified images, network locations of already classified images, and documents containing classified images. For example, the image information includes web URLs or pointers to database entries of the unclassified images or already classified images, as well as locations of documents related to the images. The database can also be searched to locate images matching an input query. The query can include an image, or text specifying a search topic or category, and may further include a semantic query. A combination of image and text data can also be used as a query.

The database may not contain any images at all, but may instead contain digital image classification information and the network addresses of digital images and documents containing the digital images. In general, the database contains pointers to externally stored, pre-classified digital images, and related documents. The database itself may be local or remote, and it could be distributed over a plurality of locations.

In some embodiments, the system may transform image data into characteristic vectors or multidimensional matrixes. Characteristic vectors or multidimensional matrixes include the important features of a facial structure. In some embodiments, the database may only store the transformed facial image data (or vectorized facial image data), such that original facial images are not accessible without an operation to inverse the transformed images. In some embodiments, the system may apply encryption to original image data or transformed image data.

The images stored in or referenced by the database may be obtained at least in part through the Internet, such as by the activity of an automated web crawler. In one embodiment, the images are medical images, and the database may be searched for at least one image that satisfies thresholds established by a search query. The database may be remotely located and accessed through the Internet via a server. In one embodiment, an image query to the database server can be made in conjunction with a text-based search algorithm executed by the server to retrieve a multi-media object from or through the database.

In some embodiments, the database can be a database of known individuals (e.g., law enforcement, surveillance, and recently driver licenses). For example, the database can be the image database is a known-criminal database, a law-enforcement database, or a database of the image hosting website. A criminal or fraud modules may be provided to process situations when the system determines that the identified person is or may be a criminal or committing fraud. Likewise, if a crime is being committed, the module may be activated. Upon activation, a priority notice may be provided to the user, and law enforcement may optionally be called to investigate and protect the user who captured the image of the criminal. Criminal information may also be used to load important information about potentially dangerous individuals and may be used in conjunction with the database information and facial recognition.

D. Facial Detection and Recognition

The system may include a facial detection module. The facial detection can take place at a camera, a user device, or a server device (e.g., a remote server device). The facial detection module may include facial detection algorithms capable of detecting a face from a variety of angles, although facial recognition algorithms are most accurate in straight on photos. In some embodiments, facial images with higher quality will be processed first by the facial detection module before those with lower quality or at different angles other than straight toward the face. The processing may occur on a camera, a mobile device or at a remote server that has access to large databases of image data or facial identification data.

The facial detection process can be performed by a custom search application on a user device (e.g., mobile device, desktop computer). The facial images that meet the quality standard will be selected for additional processing, such as cropping, resizing, or compression. The system will then transmit the processed facial image data to a server device. Since the user devices handle facial detection and preprocessing of the captured facial images, it reduces the time that is required for a server device to perform facial recognition. Also, it reduces the requirements for network bandwidth and increases the transmission speed over the network.

In some embodiments, facial detection may employ algorithms, such as a higher order gradient algorithm (HOG). HOG is suitable for smaller photos which can be run on regular CPUs. Alternatively, the system may employ a newer CNN algorithm that can be used for larger photos.

Similarly, the facial recognition process may occur on the mobile device or the remote server. However, a server device is better suited for this task since it is often equipped with faster and multiple processors and has access to the large databases required for identification of the unknown person.

To perform a facial recognition process, the system can be implemented on a camera (e.g., a surveillance camera), a user device, or a server device. The system may include a facial image processor and a facial recognition algorithm embodied in suitable media. The facial recognition algorithm is executable with digital format image data by the facial processor to detect faces. The facial recognition algorithm produces facial image data. The facial processor is in communication with a facial signature database to obtain reference data. The facial signature algorithm compares facial image data with reference data to identify correlations. The system may include a compression algorithm producing compressed image data and a network stack configured to transmit to the network facial image data for each detected face and compressed image data to a remote server that hosts an image database or a personal information database.

In some embodiments, the facial recognition data include a vector representation of the captured facial image of the subject. Similarly, the reference facial recognition data may also include a vector representation of the stored facial image in the database. In some embodiments, the vector representation comprises a 512 point vector or a 1024×1024 facial data matrix. In some embodiments, the system may use a facial embedding process (e.g., using the neural network to convert facial images to vectors) that utilized a triplet-loss based method or a different function other than the standard Softmax function. For example, Additive Angular Margin Loss can be used to have much higher accuracy with an order of magnitude less amount of training data. The vector search may require that all reference vectors are store in an in-memory (RAM) database. With compression algorithms like optimized product quantization (OPQ), Hierarchical Navigable Small World (HNSW), the system can search billions of face vectors in under 100 ms.

In some embodiments, the step of comparing further comprises comparing the vector representation of the captured facial image of the subject to a vector representation associated with the stored facial images in the database.

Comparing the facial recognition data can be performed by a machine learning module. The machine learning module comprises a deep convolutional neural network (CNN). In some embodiments, identification of the candidate is performed by the k-nearest neighbors algorithm (k-NN).

Deep convolutional neural networks (CNNs) are the predominant types of neural networks used for multidimensional signal processing. The term deep refers generically to networks having from a "few" to several dozen or more convolution layers, and deep learning refers to methodologies for training these systems to automatically learn their functional parameters using data representative of a specific problem domain of interest. CNNs are currently being used in a broad spectrum of application areas, all of which share the common objective of being able to automatically learn features from (typically massive) databases and to generalize their responses to circumstances not encountered during the learning phase. Ultimately, the learned features can be used for tasks such as classifying the types of signals the CNN is expected to process.

k-NN is a non-parametric method used for classification and regression. In both cases, the input consists of the k closest training examples in the feature space. The output depends on whether k-NN is used for classification or regression: (1) In k-NN classification, the output is a class membership. An object is classified by a plurality vote of its neighbors, with the object being assigned to the class most common among its k nearest neighbors (k is a positive integer, typically small). If k=1, then the object is simply assigned to the class of that single nearest neighbor. (2) In k-NN regression, the output is the property value for the object. This value is the average of the values of k nearest neighbors. k-NN is a type of instance-based learning, or lazy learning, where the function is only approximated locally, and all computation is deferred until classification. The k-NN algorithm is among the simplest of all machine learning algorithms.

In some embodiments, the method may further include detecting a liveness gesture. The liveness gesture is based on at least one of a yaw angle of a second image relative to a first image and a pitch angle of the second image relative to the first image, wherein the yaw angle corresponds to a transition centered around a vertical axis, and wherein the pitch angle corresponds to a transition centered around a horizontal axis.

FIG. 6 shows an example interface of a search application on a mobile device displaying candidate images in the databases matching the captured facial images. After performing a facial recognition process, the system may identify one or more candidate images that match the captured facial images. The system may rank the candidate images based on a scoring algorithm. For example, the degree of match can be measured as a "distance" value (e.g., Euclidean distance). The smaller distance value indicates a higher degree of match between a given candidate image and the captured facial image. The system may display the candidate images on a user device. Additionally, the system displays relevant information about the candidate image, for example, name, employer, links to webpages where the candidate image can be found, etc. The user may select a candidate image that is thought to a correct match. Upon receiving a user response of selecting a particular candidate image, the system will display additional information related to the selected candidate image.

Figure 7:
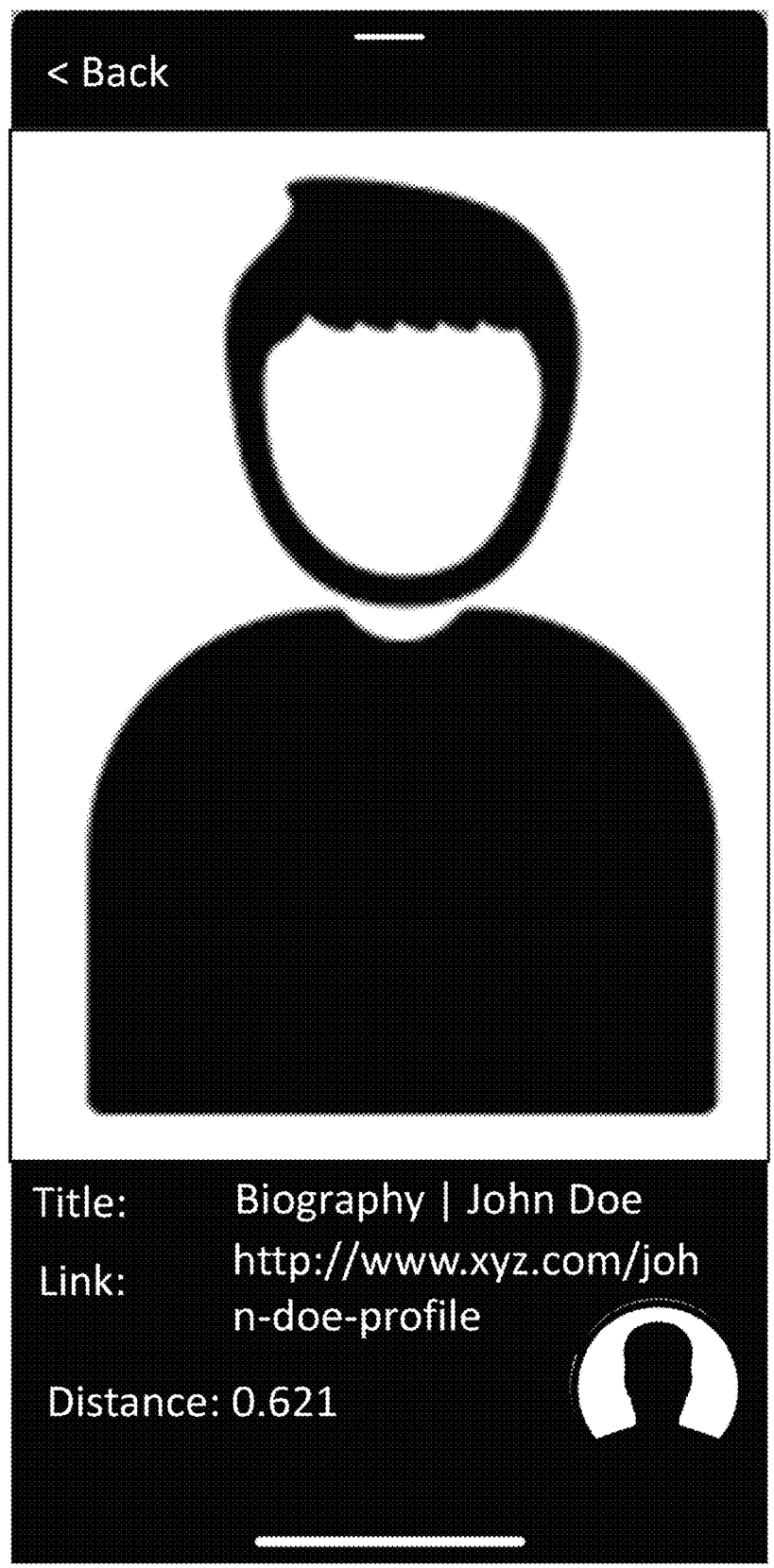
FIG. 7 shows an example interface of a search application on a mobile device displaying information about a person.

As shown in FIG. 7, the additional information about the candidate image may include: name, title, link to an online profile. The online profile can be a social network profile (e.g., Facebook, Google+), a professional network profile (e.g., LinkedIn) or an employee profile on an employer's website. Additionally, the system may also display the distance value to indicate the degree of match.

E. Neural Network-Based Facial Recognition

In some embodiments, the system may employ a machine learning module for facial recognition. The machine learning module may employ any one of the following algorithms, including, without limitation, deep convolutional neural network (CNN), support vector machines (SVMs), neural network, logistic regression, naive Bayes, memory-based learning, random forests, bagged trees, decision trees, boosted trees, boosted stumps, etc. Some embodiments of the machine learning module use unsupervised machine learning that provides training data without labeled responses. Examples of unsupervised machine learning techniques use clustering, for example, k-means clustering, hierarchical clustering, and so on.

Neural network technology, also known as "artificial neural network (ANN)," is one of the most developed tools used in machine learning modules for pattern recognition. Neural networks are constructed of processing elements known as neurons. Neurons are interconnected and arranged in a plurality of layers. Each neuron can have multiple inputs but generally only one output, which, in turn, is usually connected to many or all other neurons in the next layer. Neural networks learn by extracting relational information from the data and the desired output. A neural network in the machine learning module is initially trained or fed large amounts of data. In some embodiments, the machine learning module may employ a plurality of neural networks, which may be organized either in series, in parallel, or in a nested fashion. For example, a primary neural network may identify an abnormality of a chassis component and attempts to identify the possible source. The neural networks can be arranged in a tree pattern or in a hierarchical structure, with each neural network trained to perform a particular pattern recognition task. A group of such neural networks may be coupled to other groups of neural networks to handle more complex tasks.

Figure 8:
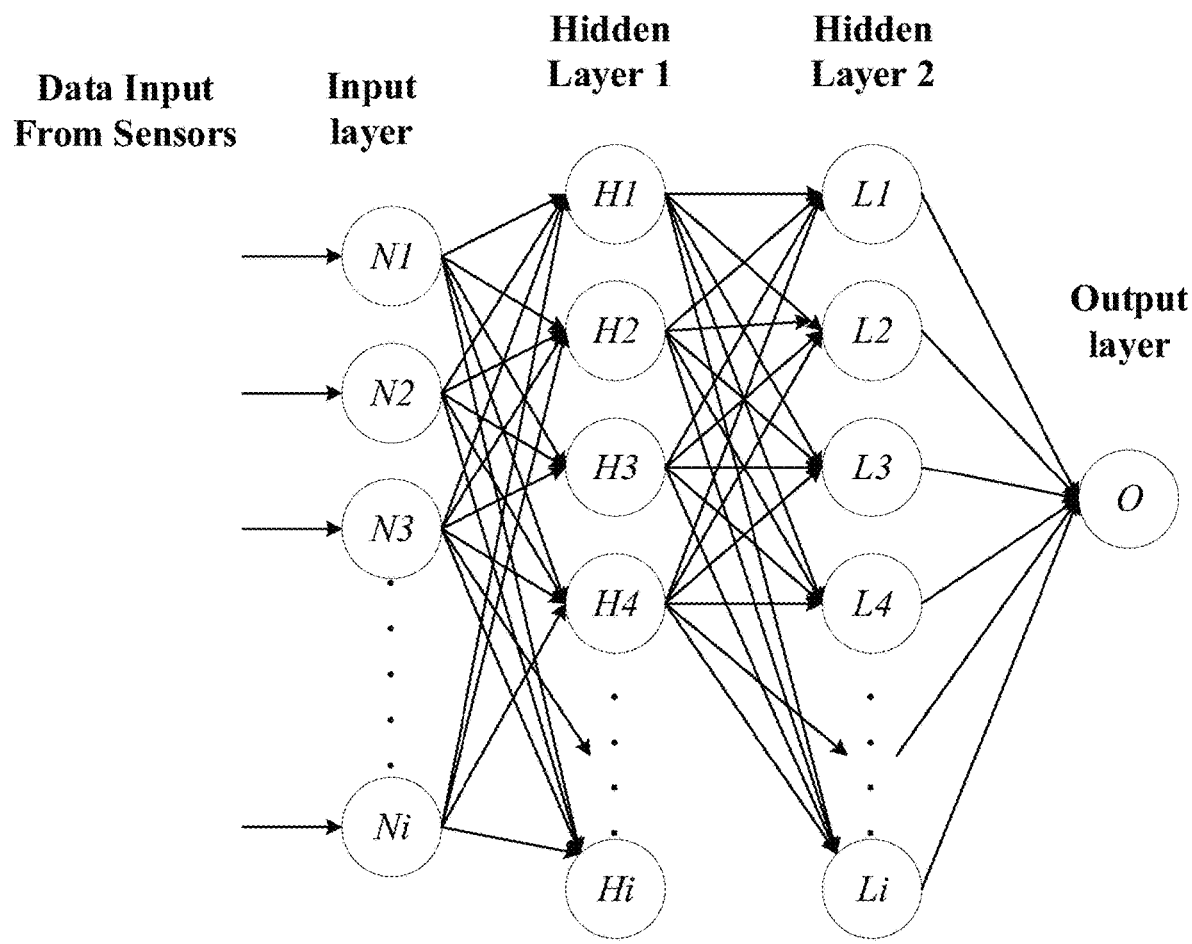
FIG. 8 shows an example neural network implemented for performing facial recognition.

FIG. 8 shows an example of a neural network used for facial recognition. Initially, the system may receive and preprocess facial image data, for example, from a user device and analyze the preprocessed data with a machine learning module implementing a neural network algorithm. The facial image data directed to the features of a face are fed into nodes N1 through Ni in the input layer.

Each of the input nodes is usually connected to each of the nodes in the second layer (e.g., a hidden layer), H1, H2, H3, H4, . . . , and Hi, through, for example, mathematical functions containing multiplying coefficients (also known as weights). At each hidden layer node, a node value may be obtained by summing the values from each of the input layer nodes, which have been operated on by functions containing the weights. Likewise, the hidden layer nodes are, in turn, connected to the nodes in the second hidden layer, L1, L2, L3, L4, . . . , and Li. The node values of the nodes of the second hidden layer are similarly generated as above described. The nodes of the second hidden layer are connected to the output layer node(s). In this example, only a single node O, representing the decision to notify the driver, and/or a remote service center, of the unbalanced tire. The output value from the output layer node may have various forms. For example, an output node value of 1 may be assigned to indicate that the driver/service center should be notified, and a value of 0 may be assigned to indicate that the driver/service center should not be notified.

Generally, in identifying matching candidate images for the captured facial image, the system may: (1) first acquire facial image data from a user device; (2) preprocess the acquired facial image data, such as digitalizing the facial image data and/or vectorizing the facial image data; (3) feed the preprocessed facial image data to a facial recognition module implementing a machine learning algorithm (e.g., a facial recognition algorithm); (4) process the facial image data using the machine learning algorithm to detect characteristic features of a face; (5) identify one or more matching candidate images and the information associated with the one or more candidate images; and (6) optionally alert the user is a person of interest. A person of interest may include a person announce missing, a person accused of a crime, a person with a criminal record, a sex offender, a person who has suffered memory loss, and a person who may otherwise pose a high risk to the public.

F. Information Outputs

Referring again to FIG. 6 and FIG. 7, upon performing above-described facial recognition process, the system may identify one or more matching candidate images with different degrees of match (for example, as measured by distance values) in an image database. The system may also retrieve the profile information stored in a personal data database. The profile information can be retrieved by the system from the personal data database include, without limitation, a name, a gender, a date of birth or an age, a place of birth a nationality, a correspondence language, a civic address, a phone number, an email address, an instant messaging identifier, financial information, marital status, hobbies, favorite sports teams, education, educational degrees, universities, and information posted by others. The profile information may also include a link to a webpage on a website containing the information related to a person of interest. For example, the website can be a social networking website, a professional networking website, a personal website, or an employer website. The system may include a privacy settings module that operates to establish a privacy setting for individuals to access a database.

In some embodiments, the personal information is retrieved from the database based on a predetermined privacy setting of the identified candidate. In some embodiments, the method further includes displaying one or more facial images of the identified candidate and the personal information associated therewith. In some embodiments, the method may also include transmitting a notification to the user device if the identified candidate poses a high risk to the public or is a criminal. In some embodiments, the personal information may include a name of the identified candidate. In some embodiments, the personal information may include a link to an online profile associated with the identified match. In some embodiments, the personal information transmitted to the user device is obtained from a webpage having the highest PageRank value among the webpages containing the personal information.

The information provided by the system may be used to determine the identity of individuals. For example, the information can be used to identify a person of interest. A person of interest may include a person announce missing, a person accused of a crime, a person with a criminal record, a sex offender, a person who has suffered memory loss, and a person who may otherwise poses a high risk to the public. In one example, the information can be used by social workers to identify homeless people or people in need. Likewise, law enforcement may use the facial recognition system to identify information about a person. By accurately identifying a person, and dynamically an in real-time obtaining information about the person, more accurate decisions may be made. Social benefits may be accurately dispensed, thereby reducing fraud. Law enforcement may use information about a person to learn if they have a medical condition or mental issue or handicap that may prevent them from responding or cause them to act inappropriately. Police may react differently to a person with no arrest record and a medical condition, and a person facially detected to have a history of assaulting police. A person with a history of DUI arrests, revealed by the facial scans, may be treated differently than a person with a history of diabetic low blood sugar symptoms. A simple facial scan can provide the identity of a person even if that person eludes capture by the police.

G. Other Applications (i) Identification Verification Based on Facial Recognition In another aspect, this disclosure also provides a method for verifying personal identification based on facial recognition. The disclosed system enables individuals to be instantly identified and approved/disapproved for entry into a venue (e.g., a building, a bank, a facility, a lab, a secured location). The system is entirely face-based and can be seamlessly implemented. It does not require downloading an app or interaction with a touch screen. The individual simply looks at the camera or a mobile device (e.g., mobile phone, iPad) and is then approved or disapproved. The system also keeps an automated log of individuals entering/leaving the building according to face, name, and date/time.

The method can be used to grant or deny access for a person to a facility, a venue, or a device. As described above, the system may include components that capture an image of a person, and then with associated circuitry and software, process the image and then compare the image with stored images, if desired. In a secured access environment, a positive match between the acquired image of the individual and a pre-stored image allows access to the facility.

In some embodiments, the method also includes (i) determining permission of access for the subject to a venue or an account based on the personal information of the identified candidate; (ii) granting the access for the subject if the identified candidate is an authorized user, or denying the access for the subject if the identified candidate is not an authorized user or a candidate matching the captured facial image cannot be identified; and (iii) transmitting a message indicative of granting or denying the access to the venue or the account. In some embodiments, the account is associated with a bank, a financial institute or a credit company.

In another aspect, this disclosure provides a method for verifying an identity of a user. For example, individual users can create their own personal "face file" that includes their headshot and a secure personal identification number (PIN). The individual can use the file/account as a form of highly secure, theft-proof facial/biometric identification for their day-to-day transactions.

In some embodiments, the method includes (a) providing a facial image data comprising a captured facial image and a personal identification number of the user; (b) transforming the facial image data to facial recognition data; (c) comparing the facial recognition data and the personal identification number to reference facial recognition data and reference personal identification numbers associated with a plurality of stored facial images of individuals to identify at least one likely candidate matching the captured facial image and the personal identification number; and (d) upon identification of the candidate, transmitting a confirmation to a user device indicating the user is an authorized user.

(ii) Facial Data Collaborative Network and Correlative Face Search

In yet another aspect, the method additionally includes providing access to the database to a plurality of users. The plurality users may be located in the same geographic area or associated with the same business type. The system enables the networking of groups of clients within the same geography or within the same or related sectors (e.g., law enforcement, retail, real estate) in order to share headshots of high-risk individuals via a secure, shared data system for the benefit of all network participants.

The system enables the use of facial images as biometric client identification and authentication for banks, financial institutions, credit companies, etc. The process also includes checking each face against the system's facial database in order to verify the individual's identity and biographical data.

In another aspect, the system matches and identifies secondary facial images within a photograph, even if the face searched is in the background and not the photo's primary subject. Correlative face search also enables instant searches of other secondary facial images within a photo with a single button press. In some embodiments, the facial image data include a second captured facial image of a second subject. In some embodiments, the method includes identifying a relationship between two or more subjects having facial images captured in a single image.

H. Network-Based Communication and Computing Architecture

FIG. 9 illustrates an example of a system 900 for implementing the disclosed methods. The system may include a chassis module 120, one or more sensors 131, 132, 133, 134, and 135, one or more internet-based server systems 910 that are capable of communicating with the chassis module 120 and with one or more client systems 920 via communication network 930. Although FIG. 9 illustrates a particular arrangement of server systems 910, client systems 920, and network 930, this disclosure contemplates any suitable arrangement of server systems, client systems, and network. As an example and not by way of limitation, one or more server of devices and one or more of client systems 920 may be connected to each other directly, bypassing network 930. As another example, two or more of client systems 920 and one or more of server systems 910 may be physically or logically co-located with each other in whole or in part. Moreover, although FIG. 9 illustrates a particular number of client systems 920 and server systems 910 and networks 940, this disclosure contemplates any suitable number of client systems 920 and server systems 910 and networks 930.

The server systems 910 may be coupled to any suitable network 930. As an example and not by way of limitation, one or more portions of network 930 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 930 may include one or more networks 930.

Links 940 may connect client systems 920 and server system 910 to communication network 930 or to each other. This disclosure contemplates any suitable links 940. In particular embodiments, one or more links 940 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 940 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 940, or a combination of two or more such links 940. Links 940 need not necessarily be the same throughout network environment 930. One or more first links 940 may differ in one or more respects from one or more second links 940.

In some embodiments, the server system 910 may generate, store, receive and send data, such as, for example, user profile data, concept-profile data, social-networking data, or other suitable data. Server system 910 may be accessed by the other components of system 900 either directly or via network 930. In particular embodiments, server system 910 may include one or more servers 912. Each server 912 may be a unitary server or a distributed server spanning multiple computers or multiple datacenters. Servers 912 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 912 may include hardware, software, or embedded logic components or a combination of two or more such components for carrying out the appropriate functionalities implemented or supported by server 912. In particular embodiments, server system 910 may include one or more data stores 914. Data stores 914 may be used to store various types of information. In particular embodiments, the information stored in data stores 914 may be organized according to specific data structures. In particular embodiments, each data store 914 may be a relational, columnar, correlation, or other suitable databases. Although this disclosure describes or illustrates particular types of databases, this disclosure contemplates any suitable types of databases. Particular embodiments may provide interfaces that enable a server system 910 and a client system 920 to manage, retrieve, modify, add, or delete, the information stored in data store 914.

In some embodiments, client system 920 may be an electronic device including hardware, software, or embedded logic components or a combination of two or more such components and capable of carrying out the appropriate functionalities implemented or supported by client systems 920. As an example and not by way of limitation, a client system 920 may include a computer system such as a desktop computer, notebook or laptop computer, netbook, a tablet computer, handheld electronic device, cellular telephone, smartphone, other suitable electronic device, or any suitable combination thereof. This disclosure contemplates any suitable client systems 920. A client system 920 may enable a network user at client system 920 to access network 930. A client system 920 may enable its user to communicate with other users at other client systems 920.

In some embodiments, client system 920 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 920 may enter a Uniform Resource Locator (URL) or other address directing the web browser to a particular server (such as server 912), and the web browser may generate a Hyper Text Transfer Protocol (HTTP) request and communicate the HTTP request to the server. The server may accept the HTTP request and communicate to client system 920 one or more Hyper Text Markup Language (HTML) files responsive to the HTTP request. Client system 920 may render a webpage based on the HTML files from the server for presentation to the user. This disclosure contemplates any suitable webpage files. As an example and not by way of limitation, web pages may render from HTML files, Extensible HyperText Markup Language (XHTML) files, or Extensible Markup Language (XML) files, according to particular needs. Such pages may also execute scripts such as, for example, and without limitation, those written in JAVASCRIPT, JAVA, MICROSOFT SILVERLIGHT, combinations of markup language and scripts such as AJAX (Asynchronous JAVASCRIPT and XML), and the like. Herein, a reference to a webpage encompasses one or more corresponding webpage files (which a browser may use to render the webpage) and vice versa, where appropriate.

Figure 10:
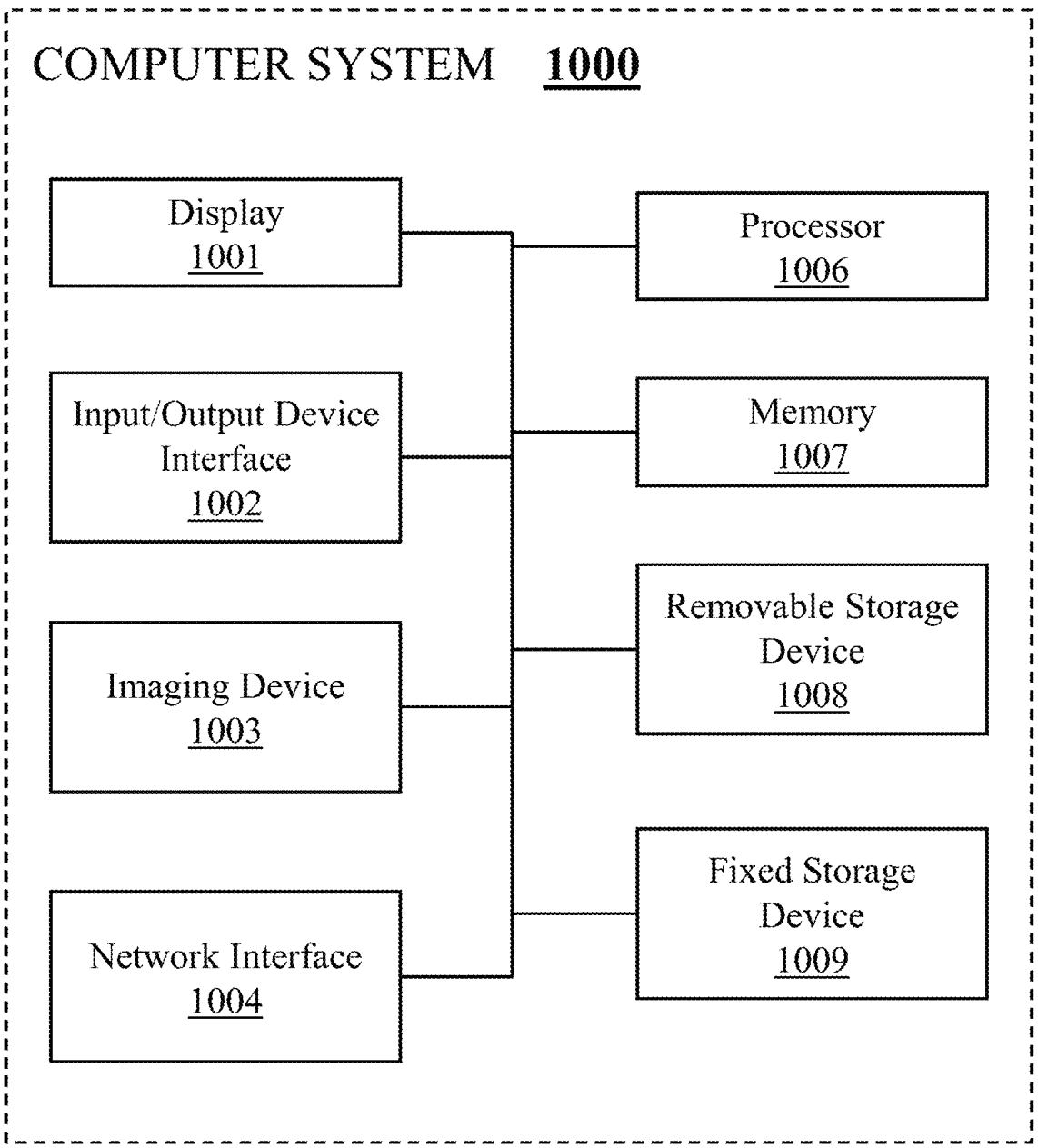
FIG. 10 shows an example computing system for implementing the disclosed methods.

FIG. 10 is a functional diagram illustrating a programmed computer system in accordance with some embodiments. As will be apparent, other computer system architectures and configurations can be used to perform the described methods. Computer system 1000, which includes various subsystems as described below, includes at least one microprocessor subsystem (also referred to as a processor or a central processing unit (CPU) 1006). For example, processor 1006 can be implemented by a single-chip processor or by multiple processors. In some embodiments, processor 1006 is a general purpose digital processor that controls the operation of the computer system 1000. In some embodiments, processor 1006 also includes one or more coprocessors or special purpose processors (e.g., a graphics processor, a network processor, etc.). Using instructions retrieved from memory 1007, processor 1006 controls the reception and manipulation of input data received on an input device (e.g., image processing device 1003, I/O device interface 1002), and the output and display of data on output devices (e.g., display 1001).

Processor 1006 is coupled bi-directionally with memory 1007, which can include, for example, one or more random access memories (RAM) and/or one or more read-only memories (ROM). As is well known in the art, memory 1007 can be used as a general storage area, a temporary (e.g., scratch pad) memory, and/or a cache memory. Memory 1007 can also be used to store input data and processed data, as well as to store programming instructions and data, in the form of data objects and text objects, in addition to other data and instructions for processes operating on processor 1006. Also as is well known in the art, memory 1007 typically includes basic operating instructions, program code, data, and objects used by the processor 1006 to perform its functions (e.g., programmed instructions). For example, memory 1007 can include any suitable computer-readable storage media described below, depending on whether, for example, data access needs to be bi-directional or uni-directional. For example, processor 1006 can also directly and very rapidly retrieve and store frequently needed data in a cache memory included in memory 1007.

A removable mass storage device 1008 provides additional data storage capacity for the computer system 1000, and is optionally coupled either bi-directionally (read/write) or uni-directionally (read-only) to processor 1006. A fixed mass storage 1009 can also, for example, provide additional data storage capacity. For example, storage devices 1008 and/or 1009 can include computer-readable media such as magnetic tape, flash memory, PC-CARDS, portable mass storage devices such as hard drives (e.g., magnetic, optical, or solid state drives), holographic storage devices, and other storage devices. Mass storages 1008 and/or 1009 generally store additional programming instructions, data, and the like that typically are not in active use by the processor 1006. It will be appreciated that the information retained within mass storages 1008 and 1009 can be incorporated, if needed, in standard fashion as part of memory 1007 (e.g., RAM) as virtual memory.

In addition to providing processor 1006 access to storage subsystems, bus 1010 can be used to provide access to other subsystems and devices as well. As shown, these can include a display 1001, a network interface 1004, an input/output (I/O) device interface 1002, an image processing device 1003, as well as other subsystems and devices. For example, image processing device 1003 can include a camera, a scanner, etc.; I/O device interface 1002 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a global positioning system (GPS) receiver, a differential global positioning system (DGPS) receiver, an accelerometer, and/or any other appropriate device interface for interacting with system 1000. Multiple I/O device interfaces can be used in conjunction with computer system 1000. The I/O device interface can include general and customized interfaces that allow the processor 1006 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 1004 allows processor 1006 to be coupled to another computer, computer network, or telecommunications network using a network connection as shown. For example, through the network interface 1004, the processor 1006 can receive information (e.g., data objects or program instructions) from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 1006 can be used to connect the computer system 1000 to an external network and transfer data according to standard protocols. For example, various process embodiments disclosed herein can be executed on processor 1006 or can be performed across a network such as the Internet, intranet networks, or local area networks, in conjunction with a remote processor that shares a portion of the processing. Additional mass storage devices (not shown) can also be connected to processor 1006 through network interface 1004.

In addition, various embodiments disclosed herein further relate to computer storage products with a computer-readable medium that includes program code for performing various computer-implemented operations. The computer-readable medium includes any data storage device that can store data which can thereafter be read by a computer system. Examples of computer-readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system as shown in FIG. 10 is an example of a computer system suitable for use with the various embodiments disclosed herein. Other computer systems suitable for such use can include additional or fewer subsystems. In some computer systems, subsystems can share components (e.g., for touchscreen-based devices such as smartphones, tablets, etc., I/O device interface 1002 and display 1001 share the touch-sensitive screen component, which both detects user inputs and displays outputs to the user). In addition, bus 1010 is illustrative of any interconnection scheme serving to link the subsystems. Other computer architectures having different configurations of subsystems can also be utilized.

Definitions

To aid in understanding the detailed description of the compositions and methods according to the disclosure, a few express definitions are provided to facilitate an unambiguous disclosure of the various aspects of the disclosure. Unless otherwise defined, all technical and scientific terms used herein have the same meaning as commonly understood by one of ordinary skill in the art to which this disclosure belongs.

It is noted here that, as used in this specification and the appended claims, the singular forms "a," "an," and "the" include plural reference unless the context clearly dictates otherwise. The terms "including," "comprising," "containing," or "having" and variations thereof are meant to encompass the items listed thereafter and equivalents thereof as well as additional subject matter unless otherwise noted.

The phrases "in one embodiment," "in various embodiments," "in some embodiments," and the like are used repeatedly. Such phrases do not necessarily refer to the same embodiment, but they may unless the context dictates otherwise.

The terms "and/or" or "/" means any one of the items, any combination of the items, or all of the items with which this term is associated.

As used herein, the term "each," when used in reference to a collection of items, is intended to identify an individual item in the collection but does not necessarily refer to every item in the collection. Exceptions can occur if explicit disclosure or context clearly dictates otherwise.

The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

All methods described herein are performed in any suitable order unless otherwise indicated herein or otherwise clearly contradicted by context. In regard to any of the methods provided, the steps of the method may occur simultaneously or sequentially. When the steps of the method occur sequentially, the steps may occur in any order, unless noted otherwise.

In cases in which a method comprises a combination of steps, each and every combination or sub-combination of the steps is encompassed within the scope of the disclosure, unless otherwise noted herein.

Each publication, patent application, patent, and other reference cited herein is incorporated by reference in its entirety to the extent that it is not inconsistent with the present to disclosure. Publications disclosed herein are provided solely for their disclosure prior to the filing date of the present invention. Nothing herein is to be construed as an admission that the present invention is not entitled to antedate such publication by virtue of prior invention. Further, the dates of publication provided may be different from the actual publication dates which may need to be independently confirmed.

It is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A system for providing information about a person, comprising:
    a facial image processing module operable to:
        download facial images of individuals and personal information associated therewith and store the downloaded facial images and associated personal information in a database;
        receive facial image data transmitted from a user device, the facial image data comprising at least a captured facial image of the person;
        transform the facial image data to facial recognition data, wherein the facial recognition data comprise one vector representation of the captured facial image of the person; and
    a facial recognition module operable to:
        compare the facial recognition data to reference facial recognition data associated with a plurality of stored facial images of individuals in the database to identify one or more candidates matching the captured facial image based on a Euclidean distance value, and a smaller Euclidean distance value indicates a higher degree of match between the facial recognition data and the reference facial recognition data, wherein the reference facial recognition data comprise a vector representation of a stored facial image in a database and the step of comparing further comprises comparing the vector representation of the captured facial image of the person to the vector representation associated with the stored facial images in the database, wherein comparing the facial recognition data is performed by a machine learning module comprising a deep convolutional neural network (DCNN), and wherein identification of the candidate is performed by the k-nearest neighbors algorithm (k-NN);
        upon identification of the one or more candidates matching the captured facial image, retrieve from the database personal information associated with each of the one or more candidates wherein the personal information comprises a name of the one or more candidates or a link to an online profile associated with the one or more candidates and wherein the personal information is retrieved from the database based on a predetermined privacy setting of each of the one or more candidates; and
        transmit and cause the user device to display an image of each of the one or more candidates, the personal information thereof, and the Euclidean distance value thereof.

2. The system of claim 1, wherein the vector representation of the captured facial image of the person or the vector representation of the stored facial image comprises a 512 point vector or a 1024×1024 point vector.

3. The system of claim 1, wherein the personal information transmitted to the user device is obtained from a webpage having the highest PageRank value among webpages containing the personal information.

4. The system of claim 1, wherein the facial image processing module is operable to preprocess an image of the person by the user device.

5. The system of claim 4, wherein the facial image processing module is operable to detect by the user device a facial image in the image of the person or perform cropping, resizing, gradation conversion, median filtering, histogram equalization, or size normalized image processing.

6. The system of claim 1, wherein the facial image is captured by a camera-enabled user device or a network camera, or imported from a second user device.

7. The system of claim 6, wherein the camera-enabled user device is provided in a customized enclosure with an opening for the camera.

8. The system of claim 1, wherein the reference facial recognition data comprise the facial images downloaded by a web crawler or the facial images obtained from the Internet, professional websites, law enforcement websites, or departments of motor vehicles.

9. The system of claim 1, wherein the database comprises a plurality of criminal records associated with the facial images stored in the database.

10. The system of claim 1, wherein the facial image data comprise a three-dimensional facial image of the person.

11. The system of claim 1, wherein the facial image processing module is operable to detect a liveness gesture based on at least one of a yaw angle of a second image relative to a first image and a pitch angle of the second image relative to the first image, wherein the yaw angle corresponds to a transition centered around a vertical axis, and wherein the pitch angle corresponds to a transition centered around a horizontal axis.

12. The system of claim 1, wherein the facial recognition module is operable to transmit a notification to the user device if the identified candidate poses a high risk to the public or is a criminal.

13. The system of claim 1, wherein the facial image data comprise a second captured facial image of a second person, and the facial recognition module is operable to identify a relation between two or more persons having facial images captured in a single image.

14. The system of claim 1, wherein the facial recognition module is operable to:
    determine a permission of access for the person to a venue or an account based on the personal information of the identified candidate;
    grant the access for the person if the identified candidate is an authorized user, or
    deny the access for the person if the identified candidate is not an authorized user or a candidate matching the captured facial image cannot be identified; and
    transmit a message indicative of granting or denying the access to the venue or the account.

15. The system of claim 14, wherein the facial recognition module is operable to provide access to the database to a plurality of users.

16. A method of verifying an identity of a user, comprising:
- providing a facial image data comprising a captured facial image of the user and a personal identification number of the user;
- transforming the facial image data to facial recognition data, wherein the facial recognition data comprise one vector representation of the captured facial image of the user;
- comparing the facial recognition data and the personal identification number to reference facial recognition data and reference personal identification numbers associated with a plurality of stored facial images of individuals to identify at least one likely candidate matching the captured facial image and the personal identification number, wherein the reference facial recognition data comprise a vector representation of a stored facial image in a database and the step of comparing further comprises comparing the vector representation of the captured facial image of the user to the vector representation associated with the stored facial images in the database, wherein comparing the facial recognition data and the reference facial recognition data is performed based on a Euclidean distance value, and a smaller Euclidean distance value indicates a higher degree of match between the facial recognition data and the reference facial recognition data, wherein comparing the facial recognition data is performed by a machine learning module comprising a deep convolutional neural network (DCNN), and wherein identification of the candidate is performed by the k-nearest neighbors algorithm (k-NN); and
- upon identification of the candidate, transmitting a confirmation to a user device indicating the user is an authorized user.

17. The method of claim 16, wherein the vector representation of the captured facial image of the user or the vector representation of the stored facial image in the database comprises a 512 point vector or a 1024×1024 point vector.

18. The method of claim 16, wherein the facial image is captured by a camera-enabled user device or a network camera, or imported from a second user device.

19. The method of claim 16, wherein the facial image data comprise a three-dimensional facial image of the user.

20. The method of claim 16, further comprising detecting a liveness gesture based on at least one of a yaw angle of a second image relative to a first image and a pitch angle of the second image relative to the first image, wherein the yaw angle corresponds to a transition centered around a vertical axis, and wherein the pitch angle corresponds to a transition centered around a horizontal axis.

* * * * *